(12) United States Patent
Suzuki (10) Patent No.: US 6,988,576 B2
(45) Date of Patent: Jan. 24, 2006

(54) RUNNING GEAR OF SADDLE-RIDING-TYPE VEHICLE

(75) Inventor: Hiromi Suzuki, Shizuoka-ken (JP)

(73) Assignee: Yamaha Hatsudoki Kabushiki Kaisha, Iwata (JP)

( * ) Notice: Subject to any disclaimer, the term of this patent is extended or adjusted under 35 U.S.C. 154(b) by 0 days.

(21) Appl. No.: 10/777,483

(22) Filed: Feb. 12, 2004

(65) Prior Publication Data

US 2004/0188162 A1 Sep. 30, 2004

(30) Foreign Application Priority Data

Feb. 14, 2003 (JP) .......................... 2003-037484
Jan. 22, 2004 (JP) .......................... 2004-014514

(51) Int. Cl.
*B62D 61/02* (2006.01)

(52) U.S. Cl. ........................ 180/190; 181/228
(58) Field of Classification Search ................. 180/227, 180/219, 89.2, 309; D12/194, 110; 181/227, 181/228, 251
See application file for complete search history.

(56) References Cited

U.S. PATENT DOCUMENTS 4,359,126 A * 11/1982 Aiba .......................... 180/219
4,487,288 A * 12/1984 Watanabe et al. ............ 181/238
6,193,004 B1 * 2/2001 Cooksey et al. ............. 180/219
6,334,501 B1 * 1/2002 Kawamoto .................. 180/309

FOREIGN PATENT DOCUMENTS

| JP | 63-232091 | 9/1988 |
| JP | 05-098959 | 4/1993 |
| JP | 05-040096 | 5/1993 |
| JP | 06-185352 | 7/1994 |
| JP | 06-330744 | 11/1994 |
| JP | 06-336922 | 12/1994 |
| JP | 08-246861 | 9/1996 |
| JP | 09-256843 | 9/1997 |
| JP | 2001-097269 | 4/2001 |

* cited by examiner

*Primary Examiner*—Tony Winner
(74) *Attorney, Agent, or Firm*—Hogan & Hartson, LLP (57) ABSTRACT

A running gear of a saddle-riding-type vehicle includes a running gear unit with an engine which is pivotally supported to a vehicle body to freely swing, an exhaust pipe extending towards a rear portion of the engine and a support unit for making the running gear unit support a midway section of the exhaust pipe in a longitudinal direction. The support unit includes a first bracket provided on the running gear unit, a second bracket provided on the midway section of the exhaust pipe and a pair of engaging members vertically arranged for engaging a rear end part of the first bracket and a front end part of the second bracket with each other in any relative position in a fore-and-aft direction.

20 Claims, 6 Drawing Sheets

RUNNING GEAR OF SADDLE-RIDING-TYPE VEHICLE

BACKGROUND OF THE INVENTION

1. Field of the Invention

The present invention relates to a running gear of a saddle-riding-type vehicle including a running gear unit with an engine, an exhaust pipe extending from the engine, and a support unit for making the engine support the exhaust pipe.

2. Description of Related Art

A running gear of a saddle-riding-type is conventionally classified into two types. One type includes a running gear unit with an engine, which is pivotally supported to a vehicle body to freely swing, an exhaust pipe extending towards the rear of the engine and a support unit for making the engine support a midway section of the exhaust pipe in the longitudinal direction.

In more detail, the support unit is provided with a first bracket protruding towards the rear of the engine, a second bracket being attached to the midway section of the exhaust pipe and protruding upwards from the midway section, a single first engaging member for engaging protruding end parts of the first and second brackets with each other and a pair of second engaging members vertically arranged for engaging a front end part of the first bracket with the engine.

The first engaging member is provided with a bolt for engaging the first and second brackets with each other by passing the bolt through a long hole extending in the fore-and-aft direction formed on the second bracket. Placing the above bolt at some certain point of the long hole will accommodate a relative error between the engine and the exhaust pipe.

On the other hand, a second type of running gear includes a support unit of provided with a first bracket protruding towards the rear of the engine bearing a rear wheel at the protruding end part, a second bracket protruding towards the front of the midway section of the exhaust pipe in the longitudinal direction, a pair of first engaging members vertically arranged for engaging the protruding end part of the second bracket to the base part of the first bracket and a pair of second engaging members vertically arranged for engaging the front end part of the first bracket with the engine.

The issue here is that in the first type of running gear, the second bracket is protruding simply upwards from the midway section of the exhaust pipe. This may cause the first bracket being engaged with the protruding end part of the second bracket or the midsection in the fore-and-aft direction to protrude long, thereby resulting in the support unit for making the engine support the exhaust pipe being larger in size and weighing too much.

Also, in the second type of running gear, the first bracket is large in size for the purpose of making the engine bear the rear wheel, resulting in it weighing too much as the support unit makes the engine support the exhaust pipe. Further, the engaging members are each structured by a mere bolt hole formed on the corresponding bracket and a bolt passing through the bolt hole. Therefore, with such engaging members, accommodating a relative error between the engine and the exhaust pipe is not easy. As a result, such a support unit may complicate assembly of the exhaust pipe to the engine.

SUMMARY OF THE INVENTION

The present invention is proposed in view of such circumstances, and an advantage thereof is to reduce the size and weight of the support unit for making the running gear unit support the exhaust pipe and to ease the assembly of the exhaust pipe to the running gear unit by the support unit.

According to a first aspect of the invention, a running gear of a saddle-riding-type vehicle includes a running gear unit 11 with an engine 13, which is pivotally supported to a vehicle body 2 to freely swing, an exhaust pipe 20 extending towards the rear of the engine 13 and a support unit 22 for making the running gear unit 11 support a midway section 21 of the exhaust pipe 20 in the longitudinal direction. The support unit 22 includes a first bracket 28 provided on the running gear unit 11, a second bracket 30 provided on the midway section 21 of the exhaust pipe 20 and a pair of engaging members 31 vertically arranged for engaging a rear end part of the first bracket 28 and the front end part of the second bracket 30 with each other on a given relative position in the fore-and-aft direction.

According to a second aspect of the invention, in addition to the first aspect, the engaging members 31 are designated as the first engaging members 31. The support unit 22 includes a pair of second engaging members 29 vertically arranged for engaging the front end part of the first bracket 28 with the running gear unit 11. Of the first and second engaging members 31 and 29, the upper first and second engaging members 31 and 29 are positioned almost at the same height in the vertical direction, while the lower first and second engaging members 31 and 29 are positioned almost at the same height in the vertical direction. Each pitch dimension P1, P1' between the first engaging members 31 and between the second engaging members 29 in the vertical direction, respectively, is set to be larger than each pitch dimension P2, P2' between the upper first and second engaging members 31 and 29 in the fore-and-aft direction and between the lower first and second engaging members 31 and 29 in the fore-and-aft direction, respectively.

According to a third aspect of the invention, in addition to the second aspect, when the vehicle body 2 is viewed from the side (FIGS. 1 and 2), the axial center 43 of the midway section 21 of the exhaust pipe 20 goes between each pair of the upper and lower first and second engaging members 31 and 29, respectively.

According to a fourth aspect of the invention, in addition to the third aspect, when the vehicle body 2 is viewed from the rear (FIGS. 3 and 4), the first bracket 28 is bent to dent the outer surface of the midway section thereof in the vertical direction, the midway section 21 of the exhaust pipe 20 is positioned on the outer side of the dent 45, and the exhaust pipe 20 is placed in a position forming a gap 46 between the midway section 21 thereof and the dent 45.

According to a fifth aspect of the invention, the exhaust pipe 20 includes an exhaust pipe body 24 extending towards the rear of the engine 13 and an exhaust muffler 25 extending towards the rear of a rear end part of the exhaust pipe body 24. The second bracket 30 is attached to both the exhaust pipe body 24 and the exhaust muffler 25.

Note herein that the reference numerals provided to the terms in this section do not limit the technical scope of the present invention to the contents in the "DETAILED DESCRIPTION OF THE PREFERRED EMBODIMENTS" section.

The advantageous effects achieved by the present invention are as follows.

According to the first aspect of the present invention, a running gear of a saddle-riding-type vehicle includes a running gear unit with an engine, which is pivotally supported to a vehicle body to freely swing, an exhaust pipe extending towards the rear of the engine and a support unit for making the running gear unit support a midway section of the exhaust pipe in the longitudinal direction. The support unit includes a first bracket provided on the running gear unit, a second bracket provided on the midway section of the exhaust pipe and a pair of engaging members vertically arranged for engaging a rear end part of the first bracket and the front end part of the second bracket with each other on a given relative position in the fore-and-aft direction.

This renders the first and second brackets smaller than those which have the respective midway sections in the fore-and-aft direction engaged with each other, thereby reducing the size and weight of the support unit accordingly.

As described above, the first and second brackets are engaged with each other on a given relative position in the fore-and-aft direction. Therefore, placing the above brackets engaged on the given relative position to some certain point can accommodate a relative error between the running gear unit and the midway section of the exhaust pipe. Therefore, the assembly of the exhaust pipe to the running gear unit by the support unit can be eased.

According to a second aspect of the invention, the engaging members are designated as the first engaging members. The support unit includes a pair of second engaging members vertically arranged for engaging the front end part of the first bracket with the running gear unit. Of the first and second engaging members, the upper first and second engaging members are positioned almost at the same height in the vertical direction, while the lower first and second engaging members are positioned almost at the same height in the vertical direction. Each pitch dimension between the first engaging members and between the second engaging members in the vertical direction, respectively, is set to be larger than each pitch dimension between the upper first and second engaging members in the fore-and-aft direction and between the lower first and second engaging members in the fore-and-aft direction, respectively.

Therefore, as described above, as the first and second brackets are engaged together using a pair of first engaging members vertically arranged, the first bracket can be simpler in structure such as a vertically-oriented rectangle. That is, the support unit can be simpler in structure.

As described above, the pitch dimension in the vertical direction is set to be larger than the pitch dimension in the fore-and-aft direction. This is a preferable position setting for the engaging members in consideration of securely supporting the weight of the exhaust pipe, thus, favorably increasing to a greater degree, the support strength of the support unit for supporting the weight of the exhaust pipe.

According to the third aspect of the invention, when the vehicle body is viewed from the side, the axial center of the midway section of the exhaust pipe goes between each pair of the upper and lower first and second engaging members.

Thus, the midway section of the exhaust pipe is supported on two points by the running gear unit using the first and second engaging members and the first and second brackets. As such, the midway section is supported by the running gear unit securely. That is, the support strength of the support unit is improved to a greater degree.

According to the fourth aspect of the invention, when the vehicle body is viewed from the rear, the first bracket is bent to dent the outer surface of the midway section thereof in the vertical direction, the midway section of the exhaust pipe is positioned on the outside of the dent and the exhaust pipe is placed in a position forming a gap between the midway section thereof and the dent.

Thus, placing the midway section of the exhaust pipe utilizing the dent will prevent the midway section of the exhaust pipe from outwardly protruding too much from the vehicle. This is considered beneficial in view of improving the riding comfort of the saddle-riding type vehicle.

Further, the exhaust pipe is placed in a position forming a gap between the midway section of the exhaust pipe and the dent. Therefore, the running wind goes through the gap smoothly, effectively cooling the exhaust pipe.

According to the fifth aspect of the invention, the exhaust pipe includes an exhaust pipe body extending towards the rear of the engine and an exhaust muffler extending towards the rear of a rear end part of the exhaust pipe body. The second bracket is attached to both the exhaust pipe body and the exhaust muffler.

Here, the coupling part of the exhaust pipe body and the exhaust muffler abruptly changes in an outer dimension, and thus stress centralization easily occurs there. However, in the above structure, the second bracket is attached to both the exhaust pipe body and the exhaust muffler. Thus, the coupling part therebetween is reinforced, successfully preventing the stress centralization from occurring.

The advantage of the present invention is to provide the running gear of the saddle-riding-type vehicle which can reduce the size and weight of the support unit for making the running gear unit support the exhaust pipe, and ease the assembly of the exhaust pipe to the running gear unit by the support unit. In order to achieve the above advantage, an embodiment of the invention will be described as follows.

The running gear includes a running gear unit with an engine, which is pivotally supported to a vehicle body to freely swing. An exhaust pipe extends towards the rear of the engine and a support unit for making the running gear unit support a midway section of the exhaust pipe in the longitudinal direction is provided. The support unit includes a first bracket provided on the running gear unit, a second bracket provided on the midway section of the exhaust pipe and a pair of engaging members vertically arranged for engaging a rear end part of the first bracket and the front end part of the second bracket with each other on a given relative position in the fore-and-aft direction.

DETAILED DESCRIPTION OF THE PREFERRED EMBODIMENTS

For the purpose of describing the present invention in further detail, an embodiment thereof will be described with reference to the accompanying drawings.

In the drawings, reference numeral 1 denotes a saddle-riding-type vehicle exemplified by a motor scooter, and an arrow Fr denotes the heading direction of the vehicle 1.

The vehicle 1 is provided with a vehicle body 2, a front wheel 3 to be bore by a front fork on the front part of the vehicle body 2 to be orientable, a rear wheel 5 to be bore by a suspension unit 4 on the rear part of the vehicle body 2, a seat 6 to be supported on the upper rear part of the vehicle body 2, and a running gear 7 for enabling the rear wheel 5 to rotate. The front wheel 3 and the rear wheel 5 are positioned in the center in the width direction of the vehicle body 2, which is supported on a running surface 8 by the front wheel 3 and the rear wheel 5.

The suspension unit 4 includes a running gear unit 11 whose front end part is pivotally supported on the vehicle body 2 by a pivot axis 9 so that the rear end part thereof can freely swing in the vertical direction, and the rear end part bears the rear wheel 5 using an axle 10. Also included is an absorber 12 for making the vehicle body 2 support the running gear unit 11. The running gear unit 11 is a part of the running gear 7, including a four-cycle engine 13 being an internal combustion engine structuring the front part thereof, and a deceleration unit 14 placed in such an area as excursing towards one side (right side) from the center part of the vehicle body 2 in the width direction to be placed in a connected row arrangement in the engine 13 for interlocking the rear wheel 5 to the engine 13. Also included are a crankcase 15 pivotally supported by the pivot axis 9 to the vehicle body 2 and a cylinder 16 protruding towards the front from the crankcase 15.

The above running gear 7 includes a carburetor 18, an air cleaner 19, the exhaust pipe 20, and the support unit 22. Specifically, the carburetor 18 is a fuel supply device provided in the above vicinity of the engine 13, and coupled to the upper face of the cylinder 16 of the engine 13. The air cleaner 19 is coupled to the carburetor 18. The exhaust pipe 20 first protrudes downward from the lower face of the cylinder 16, and then protrudes towards the rear, passing through the area excursed towards one side (right side) from the center part of the vehicle body 2 in the width direction. The support unit 22 makes the crankcase 15 of the engine 13 support the midway section 21 of the exhaust pipe 20 in the longitudinal direction.

The exhaust pipe 20 includes an exhaust pipe body 24 that first protrudes downward from the lower face of the cylinder 16, and then protrudes towards the rear, passing through the outer vicinity of the crankcase 15. Also included are an exhaust muffler 25 that protrudes towards the rear, passing through the outer vicinity of the deceleration unit 14 from the rear end part of the exhaust pipe 24 and a protector 26 covering the exhaust muffler 25. Both the exhaust pipe body 24 and exhaust muffler 25 have a circular cross section, and the exhaust muffler 25 is so set as to be larger in an outer dimension than the exhaust pipe body 24.

When the engine 13 runs, the cylinder 16 of the engine 13 is supplied with a gas mixture of air and fuel via the air cleaner 19 and the carburetor 18 for combustion therein. The emission as a result of the combustion, goes through the exhaust pipe 20 to be outside from the rear of the vehicle body 2. The running force from the engine 13 in accordance with the combustion is transferred to the rear wheel 5 via the deceleration unit 14, thereby rendering the vehicle 1 to run.

The support unit 22 includes the first bracket 28 made of sheet metal and provided on the running gear unit 11, the second bracket 30 made of sheet metal and provided on the midway section 21 of the exhaust pipe 20 in the longitudinal direction, a pair of first engaging members 31 vertically arranged for engaging the rear end part of the first bracket 28 and the front end part of the second bracket 30 with each other on a given relative position in the fore-and-aft direction and a pair of second engaging members 29 vertically arranged for engaging the front end part being the base part of the first bracket 28 with the running gear unit 11.

The first bracket 28 is at a position excursing towards one side (right side) from the center part of the vehicle body 2 in the width direction, and protrudes towards the rear of the rear part of the crankcase 15 of the engine 13. The side plane thereof extends in the almost vertical direction. The second bracket 30 is welded to the midway section 21 of the exhaust pipe 20 and protrudes towards the front from the midway section 21. The side plane thereof extends in the almost vertical direction. Each of the first engaging members 31 engages the rear end part of the first bracket 28 or the protruding end part and the front end part of the second bracket 30 or the protruding end part together.

The first bracket 28 looks vertically-oriented in a rectangular shape in its entirety when the vehicle body 2 is viewed from the side. The second bracket 30 includes a pair of bracket members 32 and 33 vertically arranged for protruding, respectively, towards the front of the upper and lower surfaces of the midway section 21. Of these bracket members 32 and 33, the rear end part being the base part of the lower bracket member 33 is attached to both the rear end part of the exhaust pipe body 24, and the front end part of the exhaust muffler 25.

The first engaging members 31 are each provided with a bolt 39 and a nut 40. The bolt 39 passes through both the long hole 37 extending in the fore-and-aft direction formed on the protruding end part of the first bracket 28 and the circular bolt hole 38 formed on the protruding end part of the second bracket 30. The nut 40 is screwed together with the corresponding bolt 39. Using the bolts 39 and nuts 40, the protruding end parts of the first and second brackets 28 and 30 are engaged together. The second engaging members 29 are each provided with a bolt 36 passing through a circular bolt hole 35 formed on the first bracket 28 to engage the first bracket 28 to the crankcase 15. Here, the long hole 37 may be formed in both the first and second brackets 28 and 30, or only in the second bracket 30.

The second bracket 30 is overlaid on the outer surface of the first bracket 28. From the outside of the second bracket 30, the bolt 39 can pass through the bolt hole 38 and the long hole 37 of the first engaging member 31. The nut 40 has a seat, and is retained by a rotation-prevention device 41 on the inner side of the first bracket 28 not to rotate, and is screwed with the bolt 39. Further, the nut 40 is retained by the rotation-prevention device 41 in such a manner as to move only in the longitudinal direction in the bolt hole 38. As for the first engaging members 31, the bolt 39 of the lower first engaging member 31 and the second bracket 30 have an absorber 42 therebetween, cushioning the impact that travels from the vehicle body 2 towards the exhaust pipe 20.

In the drawings, the first bracket 28, which is formed separately from the running gear unit 11, is engaged with the crankcase 15 of the engine 13 included in the running gear unit 11, using the second engaging members 29. However, the first bracket 28 may be formed integrally with the crankcase 15. The drawings show in turn that the second bracket 30, which is formed separately from the midway section 21 of the exhaust pipe 20, is attached to the midway section 20 thereof However, the second bracket 30 may be formed integrally with the midway section 21 of the exhaust pipe 20.

In such a structure described above, the support unit 22 includes a first bracket 28 provided on the running gear unit 11, a second bracket 30 provided on the midway section 21 of the exhaust pipe 20 and a pair of engaging members 31 vertically arranged for engaging a rear end part of the first bracket 28 and the front end part of the second bracket 30 with each other in a given relative position in the fore-and-aft direction.

This renders the first and second brackets 28 and 30 smaller than those which have the respective midway sections in the fore-and-aft direction being engaged with each other, thereby reducing the size and weight of the support unit 22 accordingly.

As described above, the first and second brackets 28 and 30 are engaged with each other in a given relative position in the fore-and-aft direction. Therefore, placing the above brackets engaged in the given relative position to some certain point can accommodate a relative error between the running gear unit 11 and the midway section 21 of the exhaust pipe 20. The assembly of the exhaust pipe 20 on the running gear unit 11 by the support unit 22 can be thus eased.

In more detail, the support unit 22 is provided with the first bracket 28 that protrudes towards the rear of the engine 13 side of the running gear unit 11, the second bracket 30 being attached to the midway section 21 of the exhaust pipe 20 and that protrudes towards the front of the midway section 21 thereof and a pair of first engaging members 31 vertically arranged for engaging the protruding end parts of the first and second brackets 28 and 30 together.

As such, the second bracket 30 protrudes from the midway section 21 of the exhaust pipe 20 towards the protruding end part of the first bracket 28. Therefore, the first bracket 28 does not have to protrude that much, thereby improving the support strength of the exhaust pipe 20 by the first bracket 28. That is, improved is the support strength of the support unit 22 for making the engine 13 support the exhaust pipe 20.

As described above, the first and second brackets 28 and 30 protrude as to face each other, and the protruding end parts are engaged together to make the engine 13 of the running gear unit 11 support the exhaust pipe 20. This prevents the first and second brackets 28 and 30 from unnecessarily increasing in size and renders the first and second brackets 28 and 30 smaller. Accordingly, as described in the foregoing, the support unit 22 can be smaller in size and lighter in weight while improving the support strength thereof What is more, the first engaging members 31 are each provided with the bolt 39 passing through the long hole 37 extending in the fore-and-aft direction and formed at least on either the first bracket 28 or the second bracket 30 to engage the first and second brackets 28 and 30 with each other.

Therefore, placing the first bracket 28 and the second bracket 30 engaged in the given relative position in the fore-and-aft direction to some certain point of the long hole 37 in the longitudinal direction to which the above bolt 39 is placed, can accommodate a relative error between the engine 13 of the running gear unit 11 and the midway section 21 of the exhaust pipe 20. Therefore, the assembly of the exhaust pipe 20 to the engine 13 of the running gear unit 11 by the support unit 22 can be eased with the simple structure of the long hole 37.

In such a structure described above, the support unit 22 includes a pair of second engaging members 29 vertically arranged for engaging the front end part of the first bracket 28 with the engine 13 of the running gear unit 11. Of the first and second engaging members 31 and 29, the bolts 39 and 36 of the upper first and second engaging members 31 and 29 are positioned almost at the same height in the vertical direction, while the bolts 39 and 36 of the lower first and second engaging members 31 and 29 are positioned almost at the same height in the vertical direction. Each pitch dimension P1, P1' between the bolts 39 of the first engaging members 31 and between the bolts 36 of the second engaging members 29 in the vertical direction, respectively, is set to be larger than each pitch dimension P2, P2' between the upper first and second engaging members 31 and 29 in the fore-and-aft direction and between the lower first and second engaging members 31 and 29 in the fore-and-aft direction, respectively.

Therefore, as described above, as the protruding end parts of the first and second brackets 28 and 30 are engaged together using a pair of first engaging members 31 vertically arranged, the first bracket 28 can be simpler in structure such as a vertically-oriented rectangle. That is, the support unit 22 can be simpler in structure.

Further, as described above, the pitch dimensions P1, P1' in the vertical direction is set to be larger than the pitch dimensions P2, P2' in the fore-and-aft direction. This is a preferable position setting for the bolts 39 and 36 of the first and second engaging members 31 and 29 in consideration of securely supporting the weight of the exhaust pipe 20 which favorably increases to a greater degree, the support strength of the support unit 22 for supporting the weight of the exhaust pipe 20.

In the above structure, when the vehicle body 2 is viewed from the side (FIGS. 1 and 2), the axial center 43 of the midway section 21 of the exhaust pipe 20 goes between each pair of the upper and lower first and second engaging members 31 and 29, respectively.

Figure 1:
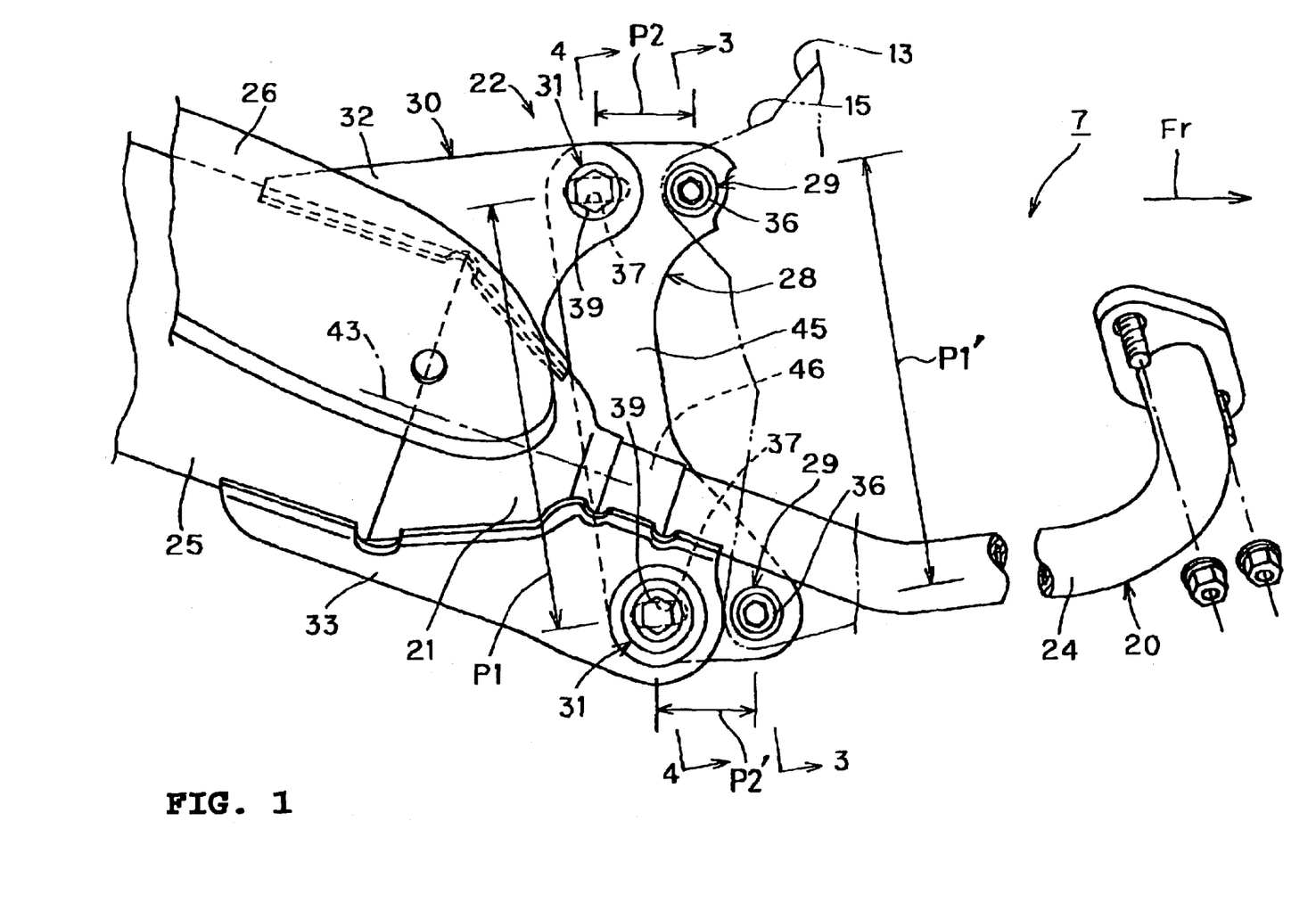
FIG. 1 is a cutaway view of an enlarging part of FIG. 2.
Figure 2:
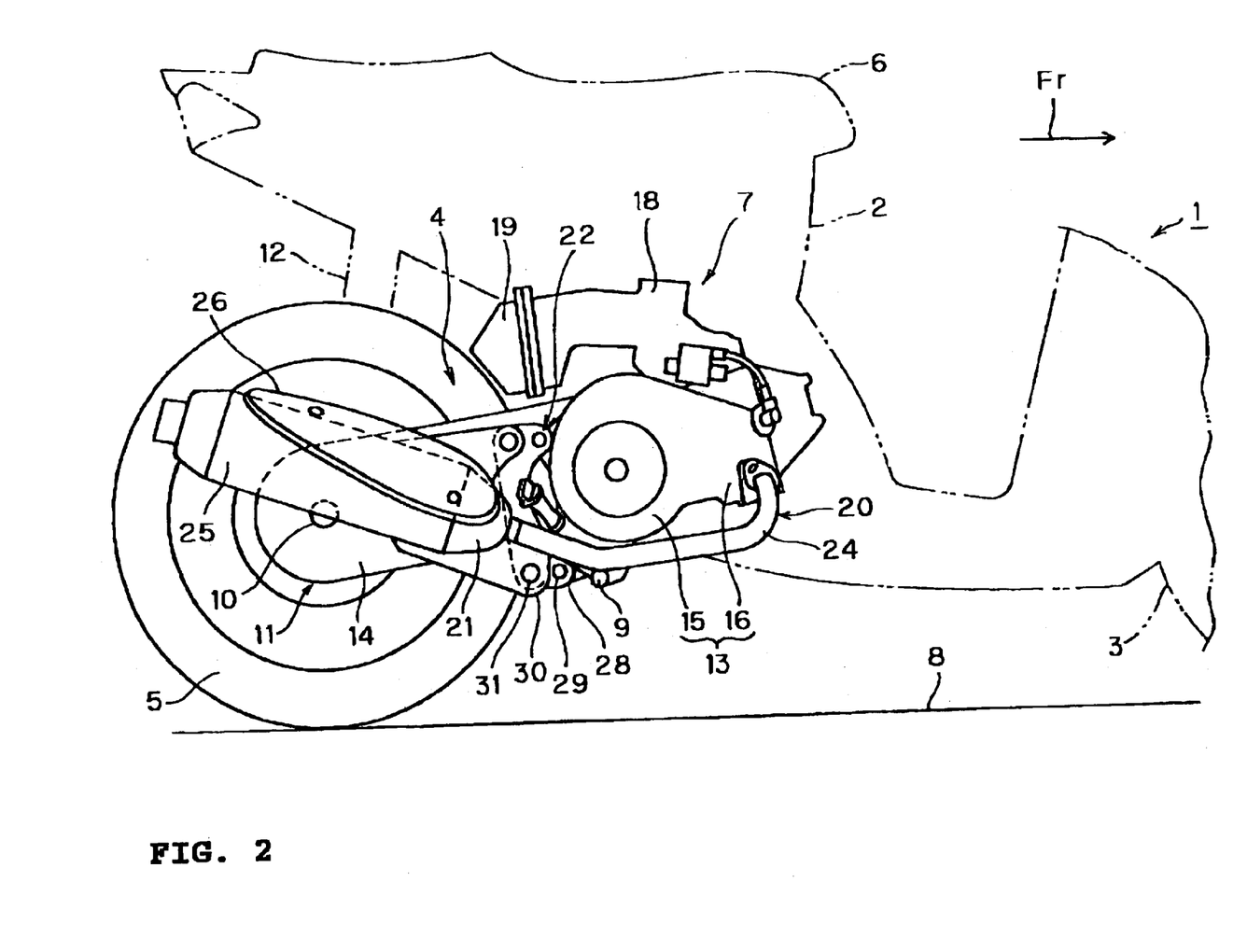
FIG. 2 is a side view of the rear part of a vehicle.

Thus, the midway section 21 of the exhaust pipe 20 is supported on two points by the engine 13 of the running gear unit 11 using the first and second engaging members 31 and 29 and the first and second brackets 28 and 30. As such, the midway section is supported by the engine 13 securely. That is, the support strength of the support unit 22 is improved to a greater degree.

In the above structure, when the vehicle body 2 is viewed from the rear (FIGS. 3 and 4), the first bracket 28 is bent to dent the outer surface of the midway section thereof in the vertical direction, the midway section 21 of the exhaust pipe 20 is positioned on the outer side of the dent 45, and the exhaust pipe 20 is placed in a position forming the gap 46 between the midway section 21 thereof and the dent 45.

Figure 3:
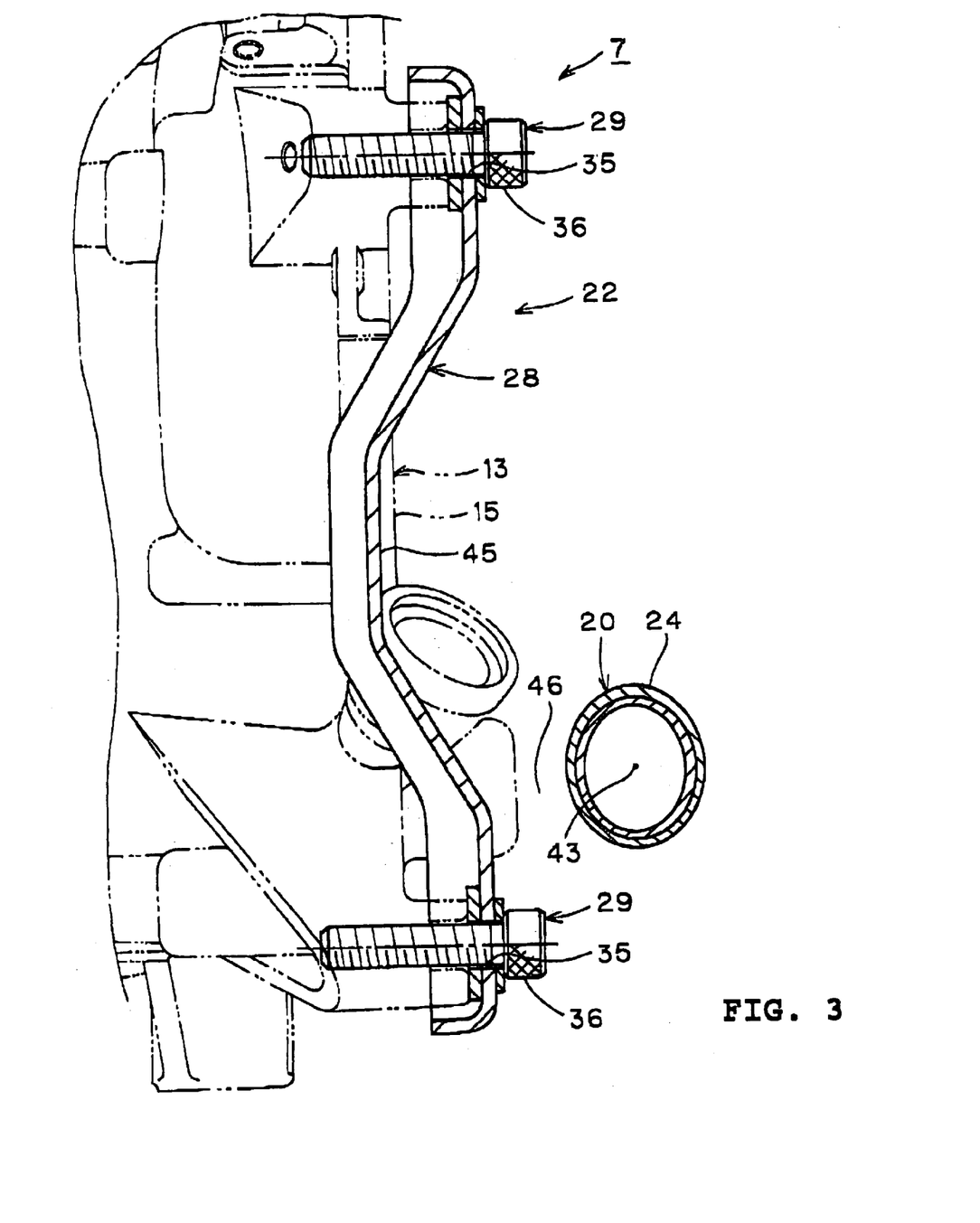
FIG. 3 is a cross sectional view cut along the 3—3 line of FIG. 1.
Figure 4:
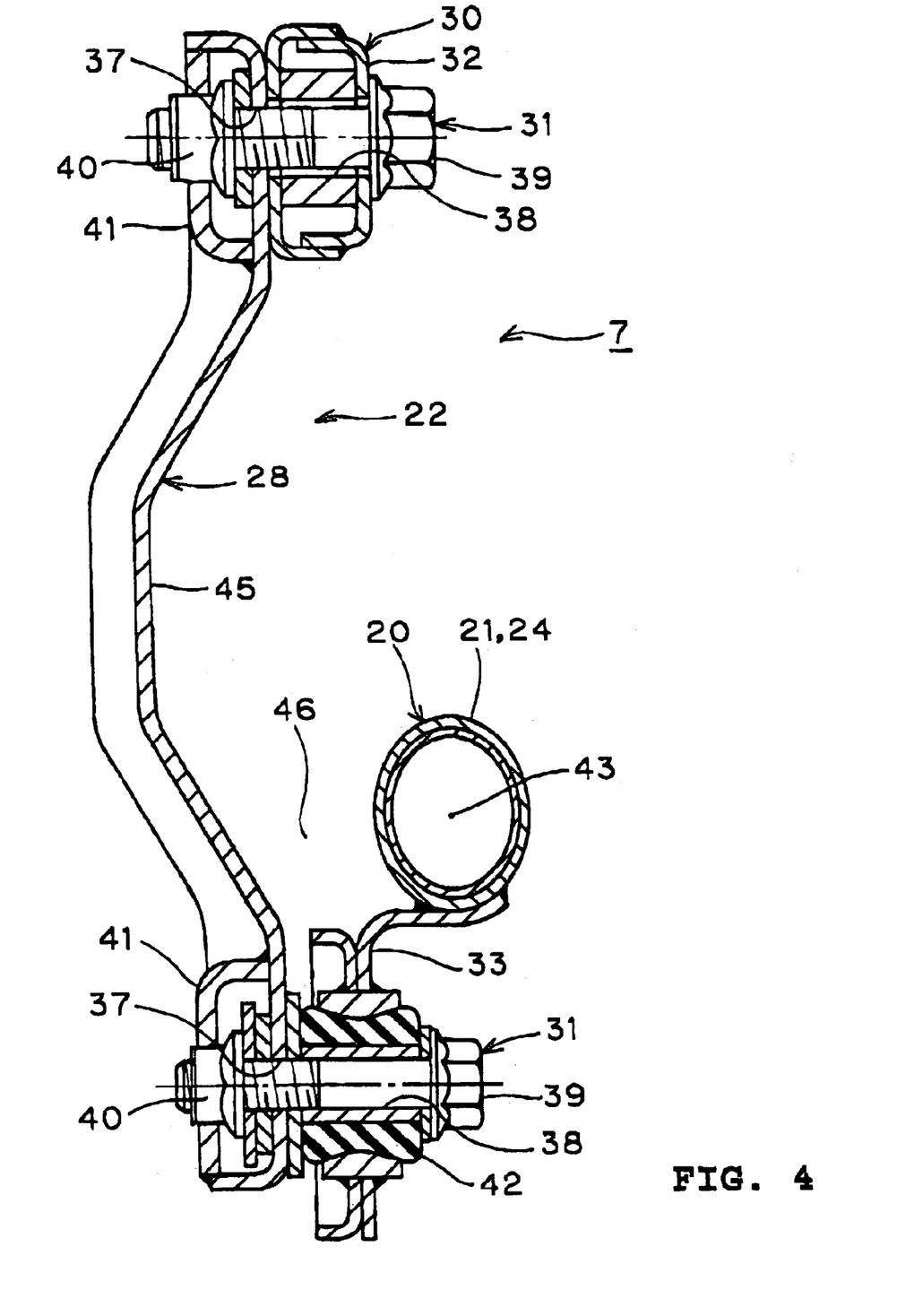
FIG. 4 is a cross sectional view cut along the 4—4 line of FIG. 1.
Figure 5:
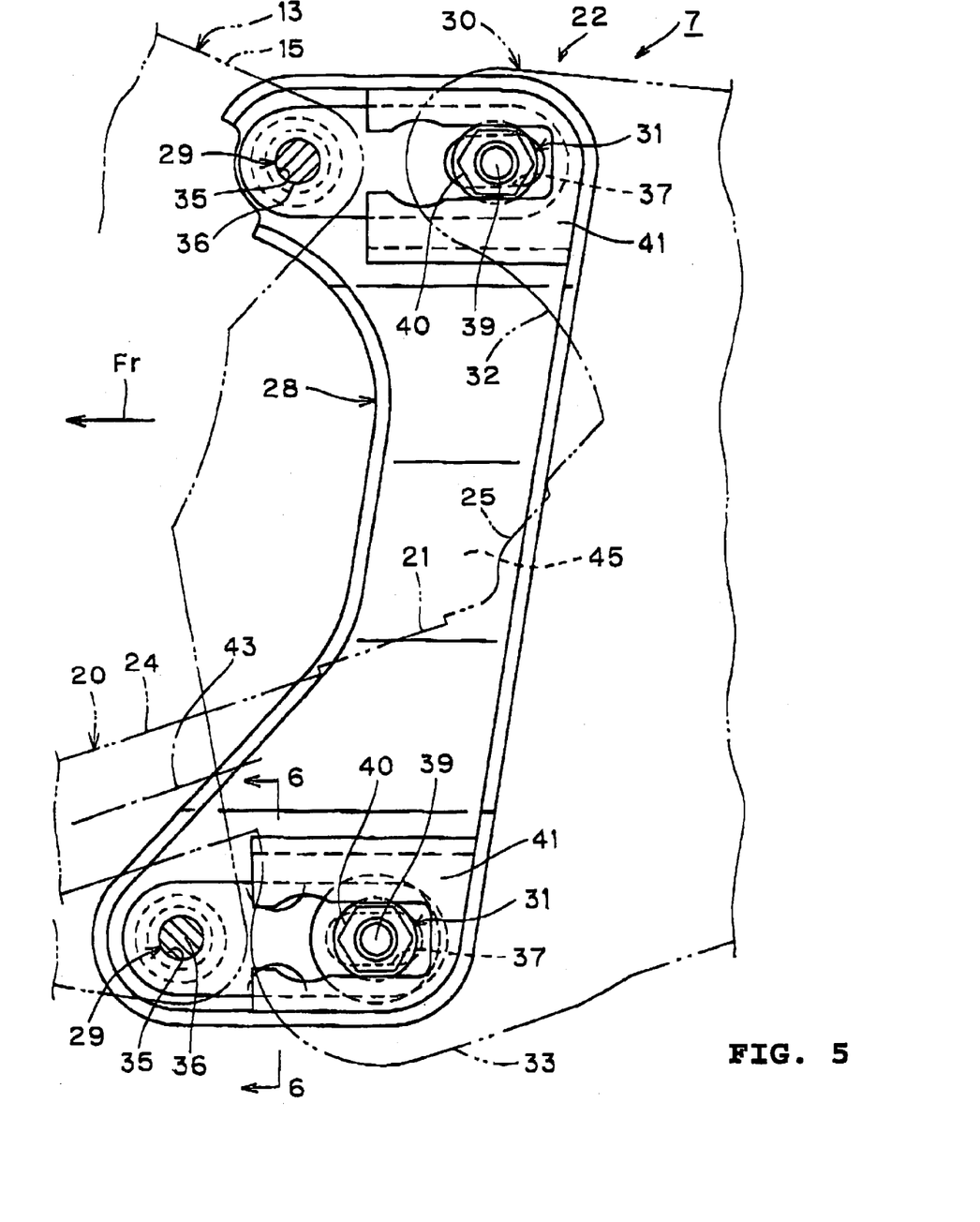
FIG. 5 is a side view of a first bracket, as a result of viewing the one in FIG. 1 from the back.
Figure 6:
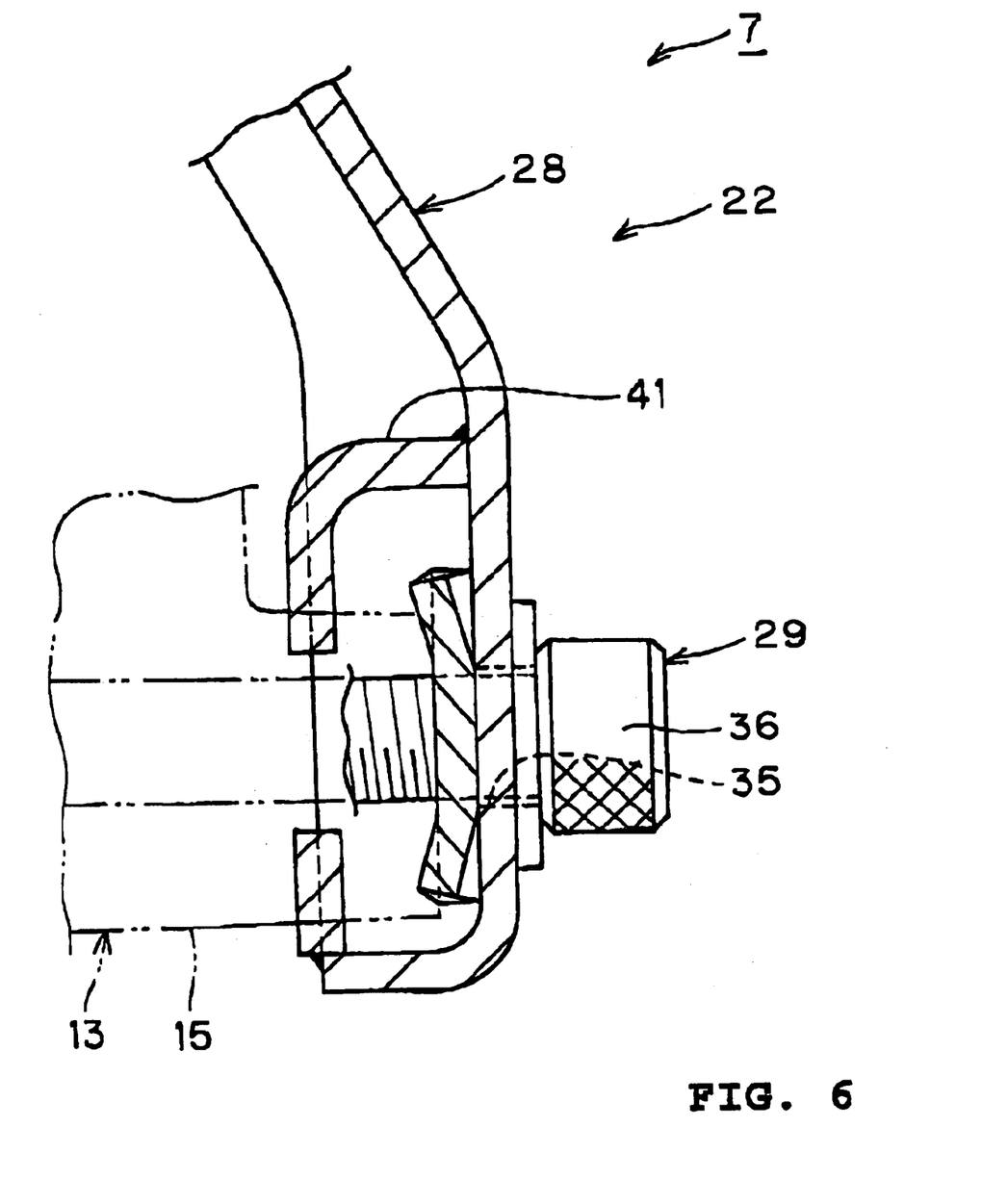
FIG. 6 is a cross sectional view cut along the 6—6 line of FIG. 5.

Thus, placing the midway section 21 of the exhaust pipe 20 utilizing the dent 45 will prevent the midway section 21 of the exhaust pipe 20 from outwardly protruding too much from the vehicle body 2. This is considered beneficial in view of improving the riding comfort of the saddle-riding type vehicle 1.

Further, the exhaust pipe 20 is placed in a position forming the gap 46 between the midway section 21 of the exhaust pipe 20 and the dent 45. Therefore, the running wind goes through the gap 46 smoothly and thus, effectively cooling the exhaust pipe 20.

As described in the foregoing, the exhaust pipe 20 includes the exhaust pipe body 24 extending towards the rear of the engine 13 and the exhaust muffler 25 extending towards the rear of the rear end part of the exhaust pipe body 24. The second bracket 30 attached to both the exhaust pipe body 24 and the exhaust muffler 25.

Here, the coupling part of the exhaust pipe body 24 and the exhaust muffler 25 abruptly changes in an outer dimension, and thus stress centralization easily occurs there. However, in the above structure, the second bracket 30 is attached both to the exhaust pipe body 24 and the exhaust muffler 25. Thus, the coupling part therebetween is reinforced, successfully preventing the stress centralization from occurring.

As described above, the bolt 39 of the first engaging member 31 can pass through the bolt hole 38 and the long hole 37 from outside the first and second brackets 28 and 30. The nut 40 of the first engaging member 31 is retained by the rotation-prevention device 41 on the inner sides of the first and second brackets 28 and 30 not to rotate, and is screwed with the bolt 39.

As such, when the second bracket 30 is engaged/disengaged to/from the first bracket 28 using the first engaging member 31, there is no need to worry about the nut 40 also rotating. What is better, the engagement/disengagement can be done utilizing the wide working area outside of the vehicle body 2. Accordingly, this eases such attachment/disattachment of the second bracket 30 and the exhaust pipe 20 to/from the first bracket 28 required when the rear wheel 5 is attached/disattached to/from the vehicle body 2.

Note here that, although the above is exemplified by referring to the accompanying drawings, the vehicle 1 may be an auto tricycle. The engine 13 may be a two-cycle engine. The running gear unit 11 may be structured only by the engine 13 and pivotally supported to the vehicle body 2, and the components of the running gear unit 11 except for the engine 13 may be securely fixed to the vehicle body 2. Alternatively, the second bracket 30 may be overlaid to the inner plane of the first bracket 28 for engagement by the first engaging member 31.

What is claimed is:

1. A running gear of a saddle riding vehicle, comprising:
   a running gear unit with an engine, which is pivotally supported to a vehicle body to freely swing;
   an exhaust pipe extending towards a rear portion of the engine; and
   a support unit for making the running gear unit support a midway section of the exhaust pipe in a longitudinal direction, the support unit comprising:
   a first bracket provided on the running gear unit;
   a second bracket provided on the midway section of the exhaust pipe; and
   a pair of engaging members vertically arranged for engaging a rear end part of the first bracket and a front end part of the second bracket with each other in any relative position in a fore-and-aft direction.

2. The running gear of the saddle riding vehicle according to claim 1, wherein the engaging members are designated as first engaging members and the support unit includes a pair of second engaging members vertically arranged for engaging the front end part of the first bracket with the running gear unit, such that of the first and second engaging members, upper first and second engaging members are positioned almost at a same height in a vertical direction, while lower first and second engaging members are positioned almost at a same height in the vertical direction, and each pitch dimension between the first engaging members and between the second engaging members in the vertical direction, respectively, is set to be larger than each pitch dimension between the upper first and second engaging members in the fore-and-aft direction and between the lower first and second engaging members in the fore-and-aft direction, respectively.

3. The running gear of the saddle riding vehicle according to claim 2, wherein when the vehicle body is viewed from its side, an axial center of the midway section of the exhaust pipe goes through between each pair of the upper and lower first and second engaging members.

4. The running gear of the saddle riding vehicle according to claim 3, wherein when the vehicle body is viewed from its rear, the first bracket is bent to dent an outer surface of the midway section thereof in the vertical direction, the midway section of the exhaust pipe is positioned on an outer side of the dent, and the exhaust pipe is placed in a position forming a gap between the midway section thereof and the dent.

5. The running gear of the saddle riding vehicle according to claim 1, wherein the exhaust pipe includes an exhaust pipe body extending towards the rear portion of the engine, an exhaust muffler extending towards a rear end part of the exhaust pipe body and the second bracket attached to both the exhaust pipe body and the exhaust muffler.

6. The running gear of the saddle riding vehicle according to claim 2, wherein the exhaust pipe includes an exhaust pipe body extending towards the rear portion of the engine, an exhaust muffler extending towards a rear end part of the exhaust pipe body and the second bracket attached to both the exhaust pipe body and the exhaust muffler.

7. The running gear of the saddle riding vehicle according to claim 3, wherein the exhaust pipe includes an exhaust pipe body extending towards the rear portion of the engine, an exhaust muffler extending towards a rear end part of the exhaust pipe body and the second bracket attached to both the exhaust pipe body and the exhaust muffler.

8. The running gear of the saddle riding vehicle according to claim 4, wherein the exhaust pipe includes an exhaust pipe body extending towards the rear portion of the engine, an exhaust muffler extending towards a rear end part of the exhaust pipe body and the second bracket attached to both the exhaust pipe body and the exhaust muffler.

9. The running gear of the saddle riding vehicle according to claim 1, further comprising a front wheel connected to a front fork of the vehicle body.

10. The running gear of the saddle riding vehicle according to claim 1, further comprising a rear wheel to be bore by a suspension unit.

11. The running gear of the saddle riding vehicle according to claim 5, wherein the exhaust pipe body and the exhaust muffle both have a circular cross section, with the circular cross section of the exhaust muffler being larger in an outer dimension than the circular cross section of the exhaust pipe body.

12. The running gear of the saddle riding vehicle according to claim 1, wherein the first bracket is made of sheet metal.

13. The running gear of the saddle riding vehicle according to claim 1, wherein the second bracket is made of sheet metal.

14. The running gear of the saddle riding vehicle according to claim 1, wherein the first bracket is at a position excursing towards one side from a center part of the vehicle body in a width direction.

15. The running gear of the saddle riding vehicle according to claim 1, wherein the second bracket is welded to the midway section of the exhaust pipe.

16. The running gear of the saddle riding vehicle according to claim 2, wherein the first engaging members are provided with a bolt and a nut.

17. The running gear of the saddle riding vehicle according to claim 1, wherein the second bracket is overlaid on an outer surface of the first bracket.

18. The running gear of the saddle riding vehicle according to claim 2, wherein the second engaging members are each provided with a bolt passing through a circular bolt hole formed on the first bracket.

19. A running gear of a saddle riding vehicle, comprising:
a running gear unit with an engine, which is pivotally supported to a vehicle body to freely swing;
an exhaust pipe extending towards a rear portion of the engine; and
means for making the running gear unit support a midway section of the exhaust pipe in a longitudinal direction, the means for making the running gear unit support a midway section of the exhaust pipe comprising:
a first bracket provided on the running gear unit;
a second bracket provided on the midway section of the exhaust pipe; and
a pair of engaging members vertically arranged for engaging a rear end part of the first bracket and a front end part of the second bracket with each other in any relative position in a fore-and-aft direction.

20. A method for manufacturing a running gear of a saddle riding vehicle, comprising:
pivotally supporting a running gear unit with an engine to a vehicle body to freely swing;
extending an exhaust pipe towards a rear portion of the engine;
making the running gear unit support a midway section of the exhaust pipe in a longitudinal direction;
providing a first bracket on the running gear unit;
providing a second bracket on the midway section of the exhaust pipe; and
arranging a pair of engaging members vertically for engaging a rear end part of the first bracket and a front end part of the second bracket with each other in any relative position in a fore-and-aft direction.

* * * * *